US008504641B2

(12) United States Patent
Spatscheck et al.

(10) Patent No.: US 8,504,641 B2
(45) Date of Patent: Aug. 6, 2013

(54) TOPOLOGY AWARE CONTENT DELIVERY NETWORK

(75) Inventors: Oliver Spatscheck, Randolph, NJ (US); David L. Applegate, Maplewood, NJ (US); Alexandre Gerber, Madison, NJ (US); Carsten Lund, Berkeley Heights, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 684 days.

(21) Appl. No.: 12/343,087

(22) Filed: Dec. 23, 2008

(65) Prior Publication Data
US 2009/0254638 A1 Oct. 8, 2009

Related U.S. Application Data (60) Provisional application No. 61/043,244, filed on Apr. 8, 2008.

(51) Int. Cl.
*G06F 15/167* (2006.01)

(52) U.S. Cl.
USPC .................... 709/213; 370/238; 370/238.1

(58) Field of Classification Search
USPC ........................................................ 709/213
See application file for complete search history.

(56) References Cited

U.S. PATENT DOCUMENTS

| 6,760,310 | B1* | 7/2004 | Sofman | 370/238 |
|---|---|---|---|---|
| 7,139,242 | B2* | 11/2006 | Bays | 370/238 |
| 7,336,613 | B2* | 2/2008 | Lloyd et al. | 370/237 |
| 7,616,574 | B2* | 11/2009 | Previdi et al. | 370/238 |
| 8,254,265 | B2* | 8/2012 | Ramachandran et al. | 370/238 |
| 2006/0029104 | A1* | 2/2006 | Jungck | 370/498 |
| 2008/0062997 | A1* | 3/2008 | Nix | 370/395.2 |
| 2008/0235400 | A1* | 9/2008 | Slocombe et al. | 709/245 |
| 2009/0217326 | A1* | 8/2009 | Hasek | 725/87 |
| 2011/0072253 | A1* | 3/2011 | Iqbal et al. | 713/1 |

* cited by examiner

*Primary Examiner* — Tauqir Hussain
(74) *Attorney, Agent, or Firm* — Akerman Senterfitt; Michael K. Dixon; Roy Zachariah (57) ABSTRACT

A method of assigning a server to a client system includes determining an ingress point of the client system and identifying possible egress points for the client system. The method further includes selecting the server from a plurality of servers to reduce network cost and delivery time.

27 Claims, 8 Drawing Sheets

TOPOLOGY AWARE CONTENT DELIVERY NETWORK

CROSS-REFERENCE TO RELATED APPLICATION(S)

This application claims priority to U.S. Provisional Patent Application No. 61/043,244, entitled "Topology Aware Content Distribution Network," filed on Apr. 8, 2008, which is assigned to the current assignee hereof and are incorporated herein by reference in their entirety.

FIELD OF THE DISCLOSURE

The present disclosure generally relates to communications networks, and more particularly relates to content delivery networks.

BACKGROUND

Packet-switched networks, such as networks based on the TCP/IP protocol suite, can distribute a rich array of digital content to a variety of client applications. One popular application is a personal computer browser for retrieving documents over the Internet written in the Hypertext Markup Language (HTML). Frequently, these documents include embedded content. Where once the digital content consisted primarily of text and static images, digital content has grown to include audio and video content as well as dynamic content customized for an individual user.

It is often advantageous when distributing digital content across a packet-switched network to divide the duty of answering content requests among a plurality of geographically dispersed servers. For example, popular Web sites on the Internet often provide links to "mirror" sites that replicate original content at a number of geographically dispersed locations. A more recent alternative to mirroring is content distribution networks (CDNs) that dynamically redirect content requests to a cache server situated closer to the client issuing the request. CDNs either co-locate cache servers within Internet Service Providers or deploy them within their own separate networks.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which:

FIGS. 4 through 7 are diagrams illustrating selection of cache servers to provide content for computers within a separate AS.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

Figure 1:
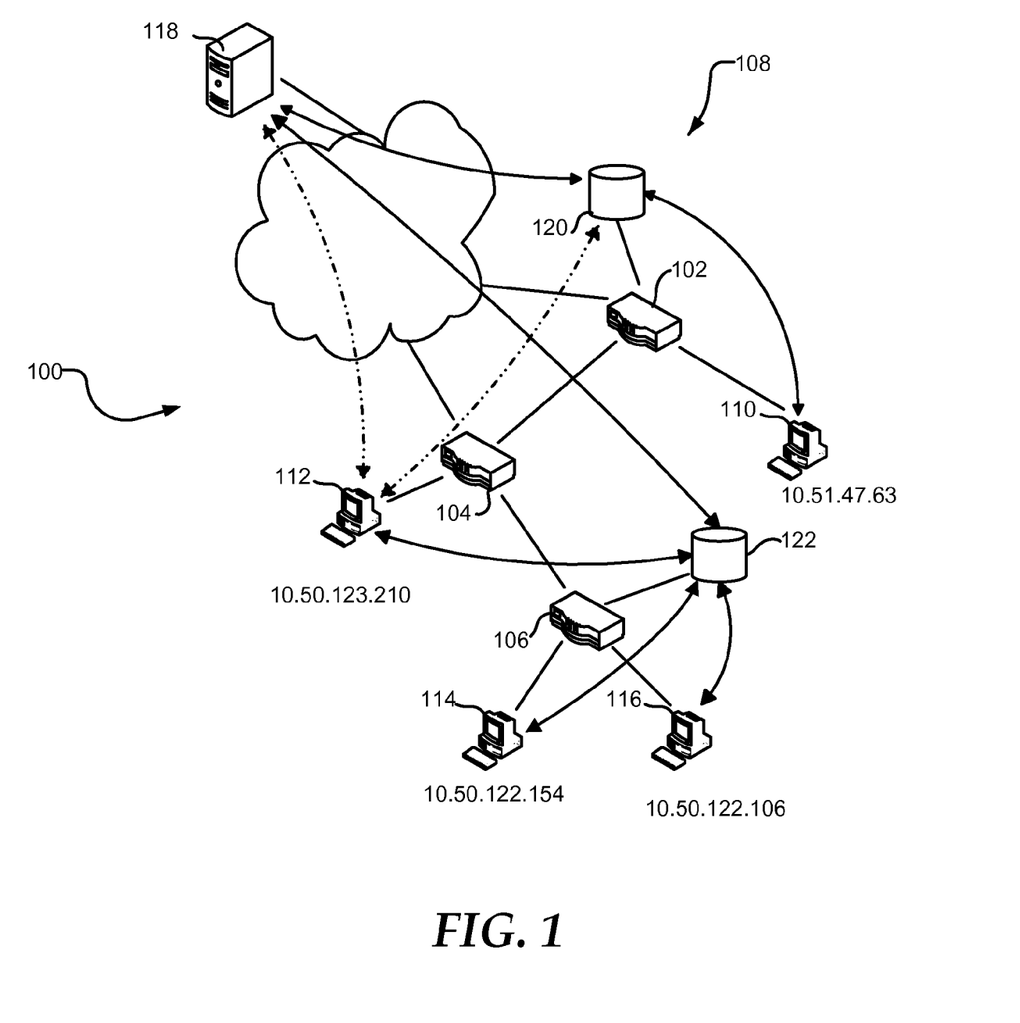
FIG. 1 is a diagram illustrating a content distribution network (CDN) in accordance with one embodiment of the present disclosure.

FIG. 1 shows a geographically disperse network 100, such as the Internet. Network 100 can include routers 102, 104, and 106 that communicate with each other and form an autonomous system (AS) 108. AS 108 can connect to other ASs that form network 100 through peering points at routers 102 and 104. Additionally, AS 108 can include client systems 110, 112, 114, and 116 connected to respective routers 102, 104, and 106 to access the network 100. Router 102 can provide ingress and egress for client system 110. Similarly, router 104 can provide ingress and egress for client system 112. Router 106 can provide ingress and egress for both of client systems 114 and 116.

Client systems 110, 112, 114, and 116 can retrieve information from a server 118. For example, client system 112 can retrieve a web page provided by server 118. Additionally, client system 112 may download content files, such as graphic, audio, and video content, and program files such as software updates, from server 118. The time required for client system 112 to retrieve the information from the server 118 normally is related to the size of the file, the distance the information travels, and congestion along the route. Additionally, the load on the server 118 is related to the number of client systems 110, 112, 114, and 116 that are actively retrieving information from the server 118. As such, the resources such as processor, memory, and bandwidth available to the server 118 limit the number of client systems 110, 112, 114, and 116 that can simultaneously retrieve information from the server 118.

Additionally, the network can include cache servers 120 and 122 replicating content on the server 118 that can be located more closely within the network to the client systems 110, 112, 114, and 116. Cache server 120 can link to router 102, and cache server 122 can link to router 106. Client systems 110, 112, 114, and 116 can be assigned cache server 112 or 114 to decrease the time needed to retrieve information, such as by selecting the cache server closer to the particular client system. The distance between a cache server and client system can be determined by the network cost and access time. As such, the distance between the cache server and the client system may be different from the geographic distance.

When assigning cache servers 120 and 122 to client systems 110 through 116, the closest cache server to each ingress/egress point can be selected. Client system 110 can be assigned cache server 120, and client systems 114 and 116 can be assigned to cache server 122. The network costs of assigning client system 112 to either of cache server 120 or 122 may be substantially identical. When the network costs associated with the link between router 102 and router 104 are marginally lower than the network costs associated with the link between router 104 and router 106, client 112 may be assigned to cache server 120.

In an exemplary embodiment, client system 110 can have an IP address of 10.51.47.63, client system 112 can have an IP address of 10.50.123.210, client system 114 can have an IP address of 10.50.122.154, and client system 116 can have an IP address of 10.50.122.106. To reduce the size of a rule set, client system 114 and 116 can be grouped into a first subnet rule, because they can share a common address prefix (10.50.122), a common ingress/egress point router 106, and can be assigned the same cache server 112. The first subnet rule may assign all client systems in the 10.50.122.0/24 subnet to cache server 122. Additionally, client system 112 can belong to neighboring subnet 10.50.123.0/24. When the difference in network costs between assigning client system 112 to cache server 120 or to cache server 122 are substantially identical, grouping client systems 112, 114, and 116 into a single rule directing all clients of the 10.50.122.0/23 subnet to cache server 122 can further reduce the size of the rule set. However, adding client system 110 to the rule set for directing traffic to cache system 122 may not be desirable, as the difference in the network costs between cache server 120 and cache server 122 may be significant for client system 110.

Client system 112 may send a request for information to cache server 122. If cache server 122 has the information stored in a cache, it can provide the information to client system 112. This can decrease the distance the information travels and reduce the time to retrieve the information. Alternatively, when cache server 122 does not have the information, it can retrieve the information from server 118 prior to providing the information to the client system 112. Alternatively, cache server 122 may attempt to retrieve the information from cache server 120 prior to retrieving the information from server 118. The cache server 112 may retrieve the information from the server 110 only once, reducing the load on server 110 and network 100 such as, for example, when client system 114 requests the same information.

Figure 2:
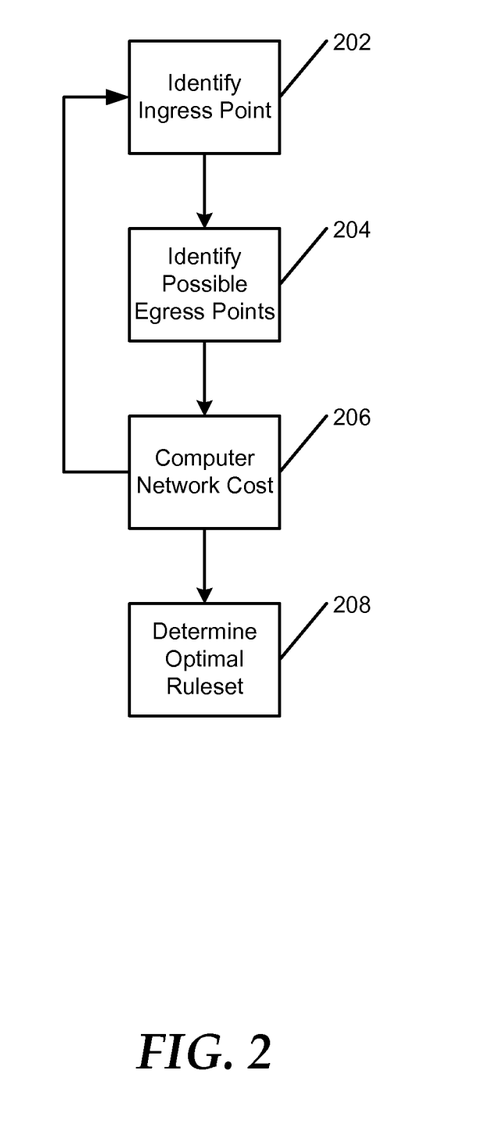
FIG. 2 is flow diagram illustrating a method of assigning cache servers in accordance with one embodiment of the present disclosure.

FIG. 2 illustrates a method for assigning cache servers, such as cache server 112, to client systems such as client system 112. At 202, an ingress point can be identified for the client system. The ingress point can be the router where traffic from the client system enters the network. When traffic from a client system enters the network at multiple places, the ingress point can be the router with the most ingress traffic from the client system. By looking at the amount of traffic from the client system, such as traffic with the IP address of the client system as a source address, flowing through each router, the ingress point can be determined. The router having the most traffic from the client system may be identified as the ingress point.

At 204, possible egress points can be determined for the client system. Egress points can be routers where traffic to the client system, i.e. traffic with a destination address matching the IP address of the client system, can exit the network. Egress points can be determined by looking at routing tables for each router in the network. Non-egress routers may forward traffic bound for the client system to other routers within the network. Egress routers can deliver traffic directly to the client system. Alternatively, when the client system is part of a separate AS, an egress router may pass the traffic to the separate AS, such as through a peering point.

At 206, for each cache server, the network cost associated with assigning the client system to the cache server can be calculated. The network cost can include distance information travels, link saturation, and other network performance factors. The cache server with the lowest network cost may be close to both the ingress point and to one of the possible egress points. The distance between a cache server and an ingress or egress point can be determined by the network cost and may be different from the geographic distance. Typically, the amount of download traffic, or traffic from the cache server to the client system, is greater than the amount of upload traffic, or traffic from the client system to the cache server. As such, a cache server closer to one of the possible egress points than to the ingress point may have a lower network cost than a cache server further from one of the possible egress points but closer to the ingress point. In an embodiment, the system may return to 202 to identify the ingress point of another client system. Alternatively, steps 202 through 206 may be performed concurrently for a plurality of client systems.

At 208, an optimal rule set can be determined. The optimal rule set may be a rule set having a minimum rule set cost. The rule set cost may be the sum of the network cost and a rule cost. A cost may be associated with increasing size of the rule set. For example, the cost of propagating the rule set throughout the network can be related to the size of the rule set. Additionally, evaluating a large rule set may impact the performance of the servers directing the client systems to the cache servers. The rule cost may be a function of the number of rules and cost associated with increasing the size of the rule set, such as minimum network cost savings required for adding a rule to the rule set. In an embodiment, the optimal rule set may be a rule set having the minimum network cost achievable for a specified rule set size. In another embodiment, the optimal rule set may be the smallest rule set having a network cost below a specified limit.

The optimal rule set may be computed starting from an initial rule set including individual rules assigning each client system to an optimal cache server for the client system. A network cost for each individual rule may be the network cost associated with assigning the client system to the optimal cache server. Client systems can grouped into a subnet rule when the network cost of the subnet rule is lower than the sum of the network costs of the client rules plus the rule cost. The network cost of the subnet rule may be the network cost of assigning all client systems within the subnet to a cache server than minimizes the network cost for the subnet. The cache server that minimizes the network cost for the subnet may be an optimal cache server for a client system within the subnet or it may be a different cache server. Increasingly larger subnets may be evaluated recursively until an optimal rule set has been identified.

In an example, client systems within a subnet can have a common optimal cache server. Client systems within the subnet can be grouped into a subnet rule, assigning all client systems within the subnet to the common optimal cache server. Additionally, neighboring subnets may be combined into a larger subnet rule. Neighboring subnets are subnets that are adjacent in IP space and may not be geographically related. Specifically, a first subnet may be assigned to a first cache server and a second subnet may be assigned to a second cache server. When the reduction of the rule set cost is greater than the increase in network costs associated with assigning both the first and second subnets to a subnet optimal cache server, directing all client systems within the first and second subnets to the subnet optimal cache server can reduce the rule set cost.

FIGS. 3 through 7 illustrate an exemplary network 300 including AS 302 and AS 304. AS 302 and AS 304 can be connected through peering points 306, 308 and 310. In an exemplary embodiment, the peering points 306, 308 and 310 may be geographically distributed, such as by being located within different cities or regions. AS 302 can include routers 312, 314, and 316 for routing traffic through the peering points 306, 308 and 310 respectively. Routers 312 and 314 may communicate through long haul link 318, and routers 314 and 316 may communicate through long haul link 320. Similarly, AS 304 can include routers 322, 324, and 326 for routing traffic through peering points 306, 308, and 310 respectively. Routers 322 and 324 may communicate through long haul link 328, and routers 324 and 326 may communicate through long haul link 330.

Figure 3:
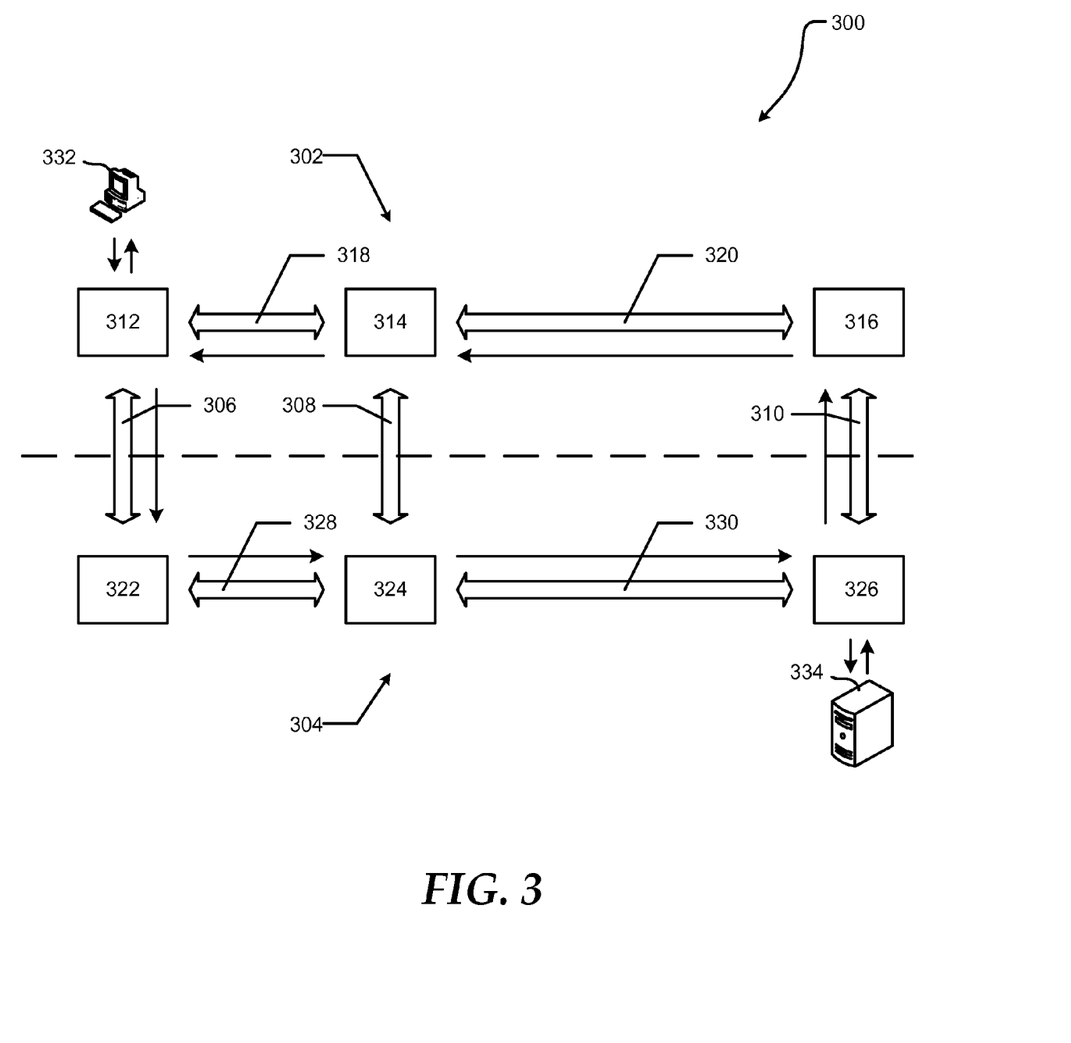
FIG. 3 is a diagram illustrating routing between autonomous systems (AS)

FIG. 3 shows a client system 332 located near router 312 in AS 302 that may request information from a server 334 located near router 326 in AS 304. The request can travel from the client system 332 to router 312. Router 312 can recognize that server 334 is part of AS 304, and direct the traffic across peering point 306 to router 322. The request can travel across AS 304 along long haul links 328 and 330 to router 326, where the request can reach server 334. Server 334 can process the request and send a response. The response can travel from server 334 to router 326. Router 326 can recognize that client system 332 is part of AS 302, and direct the response across peering point 310 to router 316. The response can travel along long haul links 320 and 318 to router 312, where the response can reach client system 332.

From the perspective of AS 304, router 322 is the ingress point for client system 332, as traffic from client system 332 bound for systems within AS 304 will generally be directed to AS 304 through the closest peering point 306. Additionally, each of routers 322, 324, and 326 can be possible egress points for client system 332. Traffic from server 334 can egress through peering point 310, while traffic from systems closer to 322 and 324 may egress through peering points 306 and 308 respectively. In this way, traffic bound for client system 332 can pass to AS 302 through the closest peering point.

Figure 4:
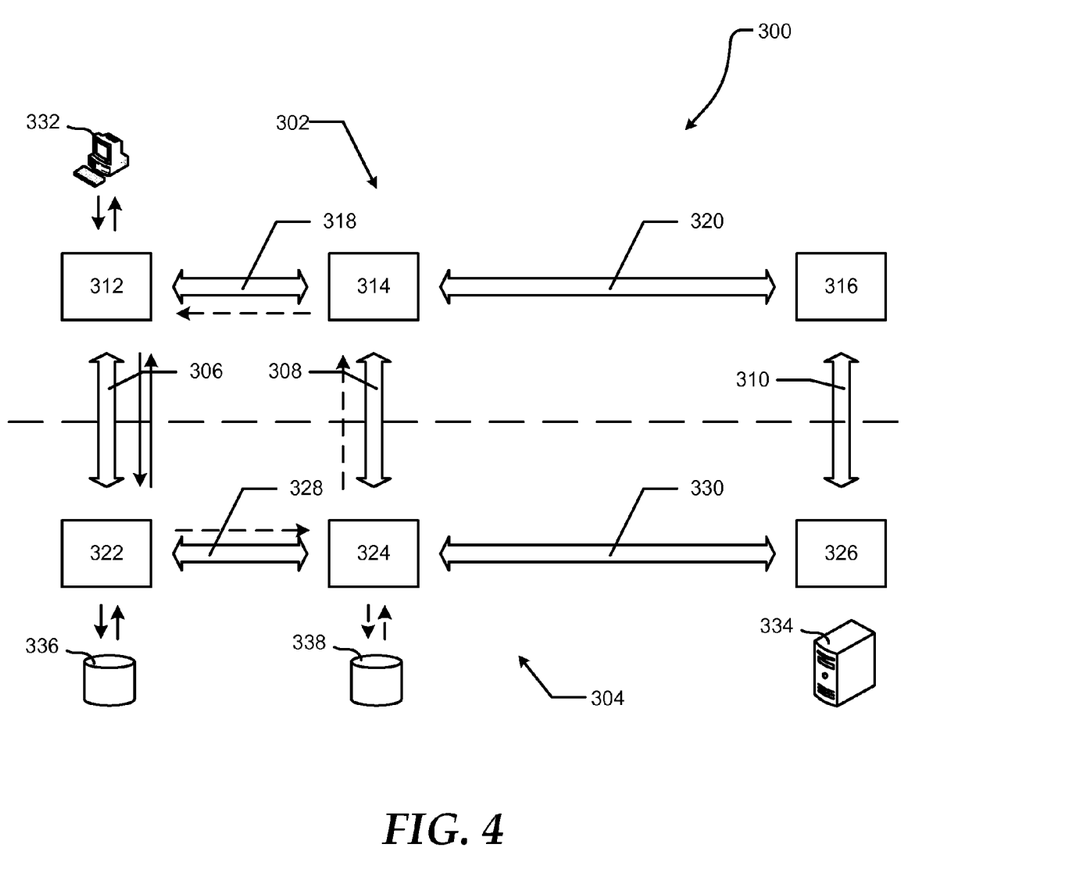

FIG. 4 shows cache servers 336 and 338 that can be located close to routers 322 and 324 respectively. Traffic between client system 332 and cache server 336 can travel back and forth across peering point 306. Alternatively, traffic from client system 332 and cache server 338 may travel across peering point 306 and along long haul link 328. Traffic from cache server 338 may travel across peering point 308 and along long haul link 318. In an embodiment where the distance to the closest egress point is similar for cache servers 336 and 338, the selection of cache server 336 for client system 332 could reduce the network cost for AS 304 by reducing traffic on long haul 328. Traffic along long haul link 318 may advantageously be reduced, but may not represent a traffic cost to AS 304 and may not be considered by the selection.

Figure 5:
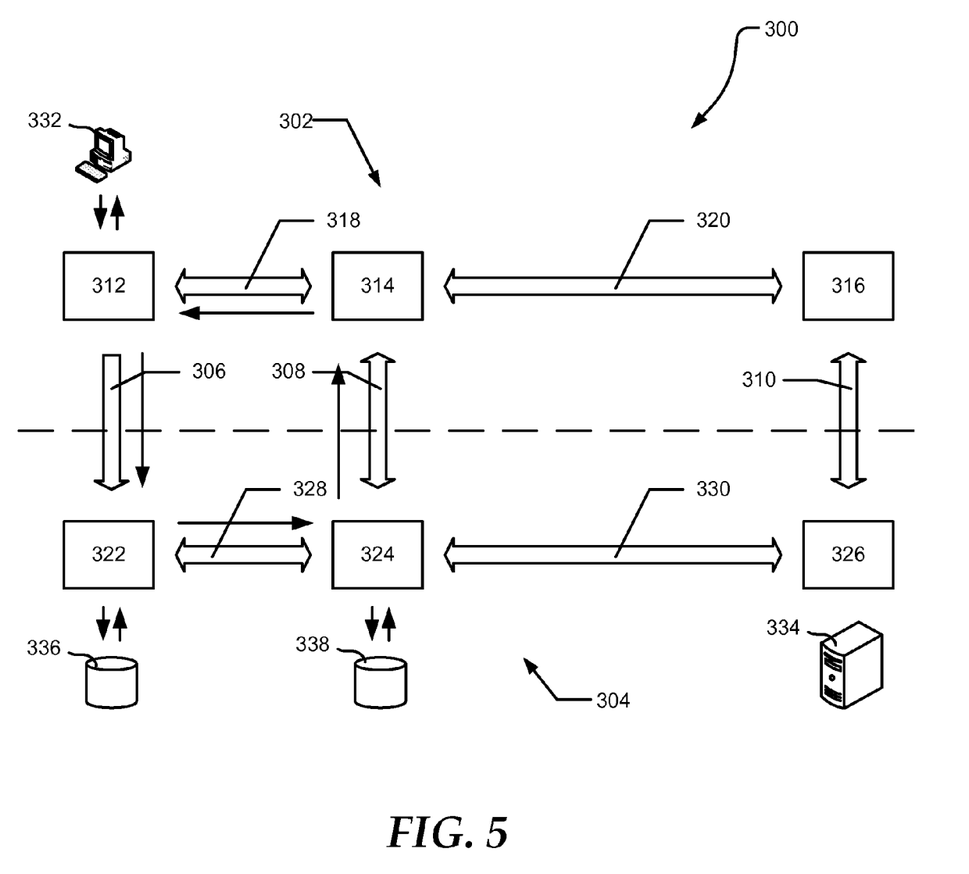

FIG. 5 shows peering point 306 that may become a one-way peering point due to saturation or failure of the link from router 322 to router 312. Alternatively, a traffic policy may prohibit or limit traffic from router 322 to router 312. In an example, the traffic policy may be implemented as an increased network cost for traffic from router 322 to router 312. While router 322 can be an ingress point for client system 332, router 322 may not be considered a possible egress point due to the one-way nature of peering point 306. A request from client system 332 to cache server 336 can travel across peering link 306, while the response may travel along long haul link 328, across peering point 308, and along long haul link 318. A request from client system 332 to cache server 336 may travel across peering point 306 and along long haul link 328, while the response may travel across peering point 308 and along long haul link 318. While the round trip time is similar for content served from either cache server 336 or cache server 338, the network cost for content served from cache server 336 can greater than for cache server 338 as the response can be larger than the request. Cache server 338 may be assigned to client system 332 to reduce the amount of traffic along long haul link 328. Traffic along long haul link 318 may not be affected, but may not represent a traffic cost to AS 304 and may not be considered by the selection.

Figure 6:
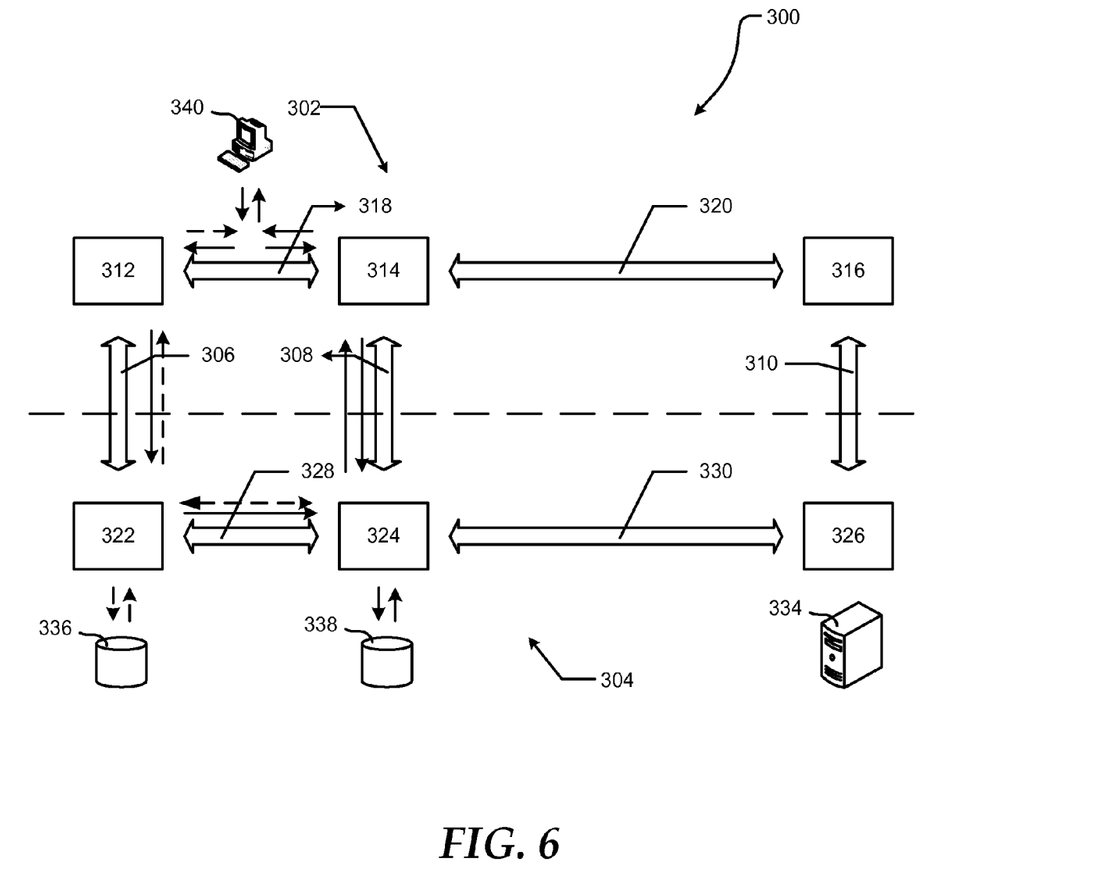

FIG. 6 shows a client system 340 that can be located within AS 302 such that traffic can be routed through either router 312 or router 314. Both router 322 and router 324 can act as an ingress point for client system 340. The choice between cache server 336 and cache server 338 depends on the relative amount of ingress traffic across peering points 306 and 308. Additionally, selection of the cache server 336 or 338 may depend on the relative network costs associated with peering points 306 and 308. For example, saturation of peering point 306 may increase the network cost associated with traffic across peering point 306 relative to the network cost associated with traffic across peering point 308. Further, selection of cache server 336 or cache server 338 may depend on the relative network costs associated with traffic traveling long haul link 328 to and from router 322. For example, asymmetric saturation of long haul link 328 may increase the network cost of traffic from router 322 to router 324 relative to the network cost of traffic from router 324 to router 322. In an embodiment, the relative network cost of using cache server 338 may be lower than the network cost of using cache server 336, and cache server 338 may be assigned to client system 340.

Figure 7:
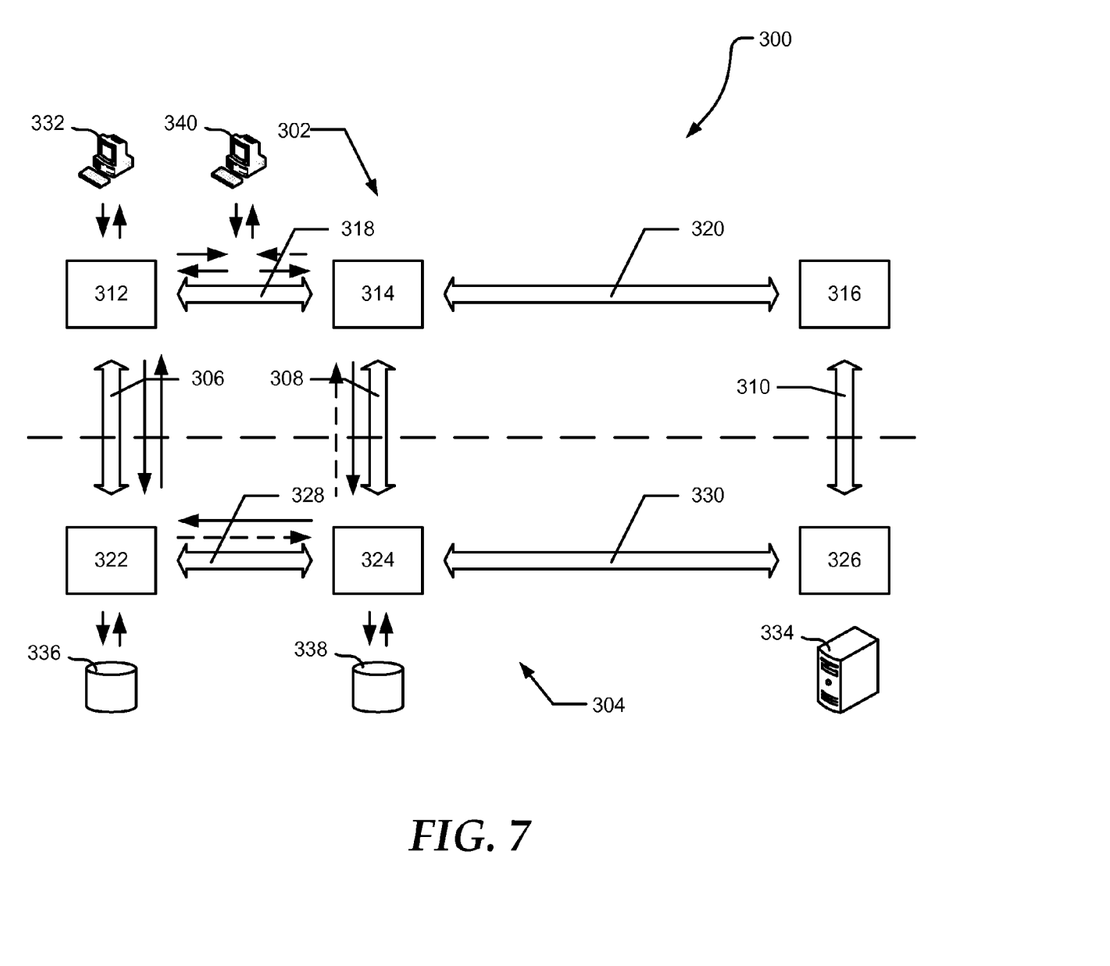

FIG. 7 shows client system 332 that can be assigned cache server 336 as in FIG. 5. When the network cost difference between assigning cache server 336 or cache server 338 to client system 340 is marginal, client system 340 may be assigned cache server 336 to reduce the size of the rule set. For example, if client system 340 and client system 332 are part of a common subnet, a subnet rule can assign cache server 336 to all members of the subnet including client systems 332 and 340. Alternatively, client system 340 may be assigned cache server 338 when the network cost difference is significant or client systems 338 and 340 do not share a common subnet. For example, client system 338 and 340 may not share a common subnet when client systems with IP addresses between the IP addresses of client system 338 and 340 are assigned a different cache server.

Figure 8:
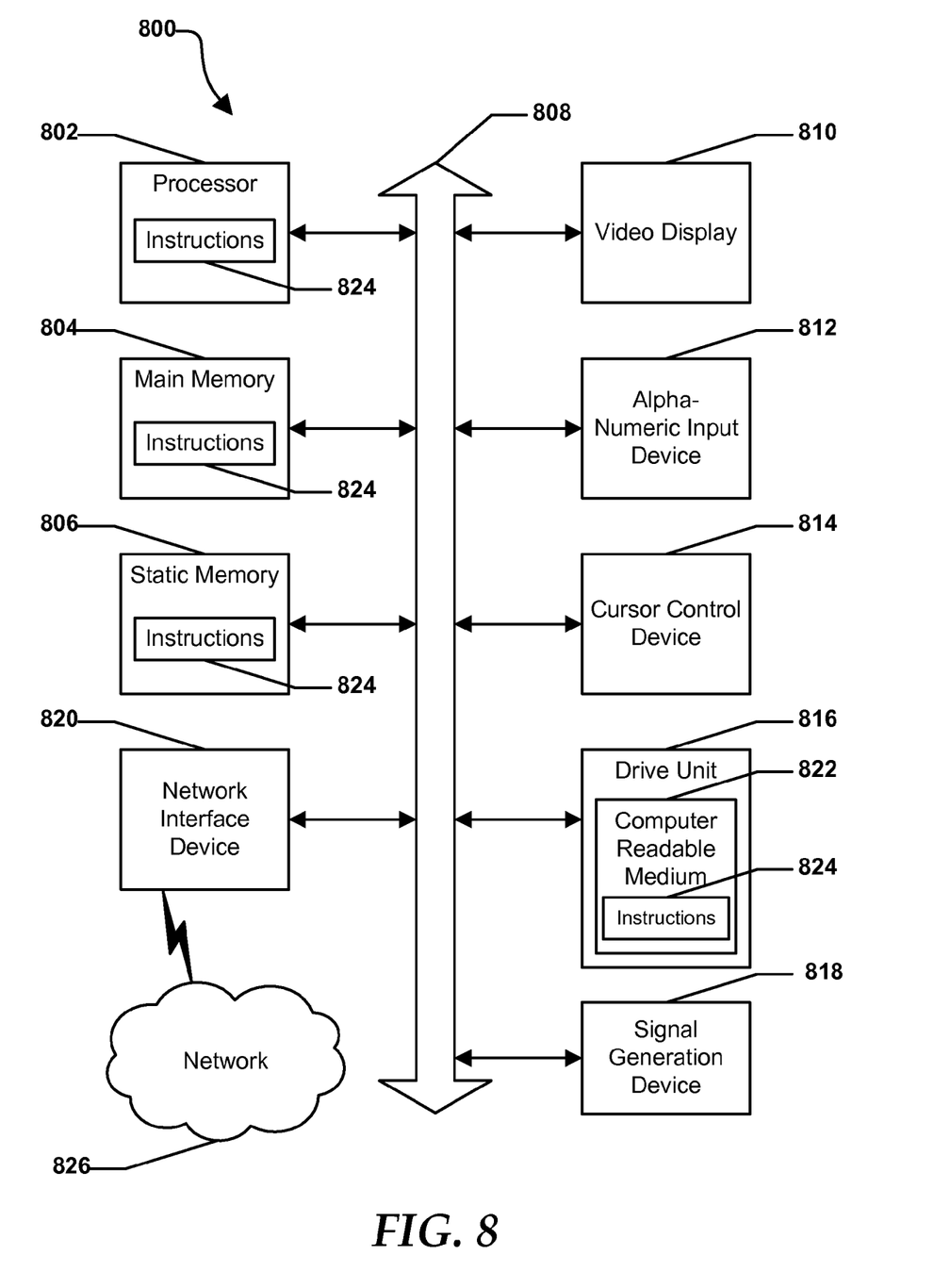
FIG. 8 is an illustrative embodiment of a general computer system.

FIG. 8 shows an illustrative embodiment of a general computer system 800. The computer system 800 can include a set of instructions that can be executed to cause the computer system to perform any one or more of the methods or computer based functions disclosed herein. The computer system 800 may operate as a standalone device or may be connected, such as by using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 800 can also be implemented as or incorporated into various devices, such as a personal computer (PC), a tablet PC, an STB, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 800 can be implemented using electronic devices that provide voice, video or data communication. Further, while a single computer system 800 is illustrated, the term "system" shall also be taken to include any collection of systems or sub-systems that individually or jointly execute a set, or multiple sets, of instructions to perform one or more computer functions.

The computer system 800 may include a processor 802, such as a central processing unit (CPU), a graphics processing unit (GPU), or both. Moreover, the computer system 800 can include a main memory 804 and a static memory 806 that can communicate with each other via a bus 808. As shown, the computer system 800 may further include a video display unit 810 such as a liquid crystal display (LCD), an organic light emitting diode (OLED), a flat panel display, a solid state display, or a cathode ray tube (CRT). Additionally, the computer system 800 may include an input device 812 such as a keyboard, and a cursor control device 814 such as a mouse. The computer system 800 can also include a disk drive unit 816, a signal generation device 818 such as a speaker or remote control, and a network interface device 820 to communicate with a network 826. In a particular embodiment, the disk drive unit 816 may include a computer-readable medium 822 in which one or more sets of instructions 824, such as software, can be embedded. Further, the instructions 824 may embody one or more of the methods or logic as described herein. In a particular embodiment, the instructions 824 may reside completely, or at least partially, within the main memory 804, the static memory 806, and/or within the processor 802 during execution by the computer system 800. The main memory 804 and the processor 802 also may include computer-readable media.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGS. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A method of assigning a plurality of client systems to a plurality of servers providing content, comprising:
    calculating a network cost for assigning a first client system to each of the plurality of servers;
    wherein calculating the network cost includes:
        identifying an ingress point for the first client system;
        identifying possible egress points for the first client system;
        calculating the network cost based on traffic from the ingress point to one of the servers and traffic from the server to one of the possible egress point;
    determining an optimal rule set effective to reduce a rule set cost of serving the plurality of client systems, the optimal rule set including assigning the first client system to a substantially optimal server of the plurality of servers; and
    grouping the first client system and a second client system into the rule set when the network cost of the rule set is lower than a sum of network costs of a rule plus a rule cost for each of the first client system and the second client system,
    wherein the rule set cost includes a total network cost and a total rule cost, the total network cost being the sum of network costs associated with serving each client system from an assigned server, and the total rule cost including a cost of distributing and processing rules in the optimal rule set.

2. The method of claim 1, wherein the network cost includes one of distance, network utilization, traffic volume, and a combination thereof.

3. The method of claim 1, wherein the total rule cost is a product of the number of rules in the optimal rule set and a per rule cost.

4. The method of claim 1, wherein the optimal rule set includes a rule set having a minimum number of rules necessary to achieve the total network cost not greater than a maximum allowable total network cost.

5. The method of claim 1, wherein the optimal rule set includes a rule set having a minimum total network cost for a specified number of rules.

6. The method of claim 1, wherein the ingress point is identified based on network traffic flows.

7. The method of claim 1, wherein the possible egress points are identified based on routing tables.

8. The method of claim 1, wherein the plurality of servers includes cache servers.

9. A method of assigning a plurality of client systems to a plurality of servers providing content, comprising:
    calculating a network cost for assigning a first client system to each of the servers based on network traffic flows and routing tables;
    wherein calculating the network cost includes:
        identifying an ingress point for the first client system;
        identifying possible egress points for the first client system;
        calculating the network cost based on traffic from the ingress point to one of the servers and traffic from the server to one of the possible egress point; and
    determining an optimal rule set effective to reduce a rule set cost, the optimal rule set including assigning the first client system to a substantially optimal server of the plurality of servers, wherein the rule set cost includes a total network cost and a total rule cost, the total network cost being the sum of network costs associated with serving each client system from an assigned server, and the total rule cost being an impact that evaluating the optimal rule set has on a performance of the substantially optimal server, and the product of a number of rules in the rule set and a per rule cost.

10. The method of claim 9, wherein the network cost includes one of distance, network utilization, traffic volume, and a combination thereof.

11. The method of claim 9, wherein calculating the network cost includes using the routing tables to identify possible egress points and using the network traffic flow to identify an ingress points; and determining an inbound network cost for traffic from the ingress point to one of the servers and an outbound network cost for traffic from the server to one of the possible egress points.

12. The method of claim 9, wherein the optimal rule set includes a rule set having a minimum number of rules necessary to achieve the total network cost not greater than a maximum allowable total network cost.

13. The method of claim 9, wherein the optimal rule set includes a rule set having a minimum total network cost for a specified number of rules.

14. The method of claim 9, wherein the plurality of servers include cache servers.

15. A method of assigning a plurality of client systems to a plurality of servers providing content, comprising:
identifying ingress points for each of a plurality of client systems; identifying possible egress points for each of the plurality of client systems;
calculating a network cost for assigning each of the plurality of client systems to each of the plurality of servers;
wherein, calculating the network cost based on traffic from the ingress point to one of the servers and traffic from the server to one of the possible egress point; and
determining an optimal rule set assigning each of the plurality of client systems to an optimal server of the plurality of servers, the optimal rule set effective to reduce a rule set cost,
wherein the rule set cost includes a total network cost and a total rule cost, the total network cost being the sum of network costs associated with serving each client system from an assigned server, and the total rule cost being an impact that evaluating the optimal rule set has on a performance of the substantially optimal server, and the product of a number of rules in the rule set and a per rule cost.

16. The method of claim 15, wherein the network cost includes one of distance, network utilization, traffic volume, and a combination thereof.

17. The method of claim 15, wherein the network cost includes an inbound network cost for traffic from the ingress point to the optimal server and an outbound network cost for traffic from the server to one of the possible egress points.

18. The method of claim 15, wherein the optimal rule set includes a rule set having a minimum number of rules necessary to achieve the total network cost not greater than a maximum allowable total network cost.

19. The method of claim 15, wherein the optimal rule set includes a rule set having a minimum network cost for a given number of rules.

20. The method of claim 15, wherein the plurality of servers include cache servers.

21. A method of assigning IP addresses to a plurality of servers providing content, comprising:
calculating a network cost for assigning an IP address to each of the plurality of servers based on network traffic flows and routing tables;
wherein calculating the network cost includes:
identifying an ingress point for the first client system;
identifying possible egress points for the first client system;
calculating the network cost based on traffic from the ingress point to one of the servers and traffic from the server to one of the possible egress point; and
determining an optimal rule set effective to reduce a rule set cost, the optimal rule set including assigning a first subnet of client systems to a substantially optimal server of the plurality of servers;
assigning a second subnet of client systems to the substantially optimal server when a reduction of the rule set is greater than an increase in a total network cost, wherein the second subnet of client systems is a neighboring subnet that is adjacent in Internet Protocol space to the first subnet of client systems,
wherein the rule set cost includes the total network cost and a total rule cost, the total network cost being the sum of network costs associated with serving each client system from an assigned server, and the total rule cost including a cost of distributing and processing rules in the rule set.

22. The method of claim 21, wherein the network cost includes one of distance, network utilization, traffic volume, and a combination thereof.

23. The method of claim 21, wherein calculating the network cost includes using the routing tables to identify possible egress points and using the network traffic flow to identify an ingress points; and determining a inbound the network cost for traffic from the ingress point to the server and an outbound network cost for traffic from one of the servers to one of the possible egress points.

24. The method of claim 21, wherein the total rule cost includes a product of a number of rules and a per rule cost.

25. The method of claim 21, wherein the optimal rule set includes a rule set having a minimum number of rules necessary to achieve a total network cost not greater than a maximum allowable total network cost.

26. The method of claim 21, wherein the optimal rule set includes a rule set having a minimum total network cost for a specified number of rules.

27. The method of claim 21, wherein the plurality of servers include cache servers.

* * * * *